United States Patent Office 3,100,211
Patented Aug. 6, 1963

---

3,100,211
PROCESS FOR THE PREPARATION OF DIHYDRO-PENTALENYL MANGANESE TRICARBONYL
Thomas H. Coffield, Heidelberg, Germany, assignor to Ethyl Corporation, New York, N.Y., a corporation of Virginia
No Drawing. Filed Jan. 12, 1960, Ser. No. 1,851
5 Claims. (Cl. 260—429)

This invention relates to a novel organometallic compound and its mode of preparation. More specifically, this invention relates to dihydropentalenyl manganese tricarbonyl and its mode of preparation.

It is an object of this invention to provide a novel method for making a novel organometallic compound which is an excellent antiknock. A further object is to provide the compound, dihydropentalenyl manganese tricarbonyl, and a method for preparing it which involves reaction of acetylene and manganese carbonyl.

My invention, therefore, involves the preparation of dihydropentalenyl manganese tricarbonyl having the formula

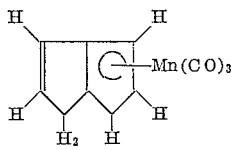

by reacting acetylene with manganese carbonyl. Although not bound by any theory as to the precise nature of the reaction, it is believed to be best represented by the following equation:

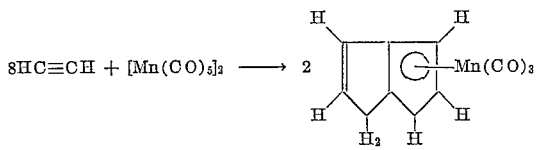

As depicted above, the reaction is believed to involve eight moles of acetylene which react with one mole of manganese carbonyl to yield two moles of dihydropentalenyl manganese tricarbonyl.

Since the manganese carbonyl is the more expensive of the two reactants utilized in my process, it is desirable to use excess quantities of the acetylene to increase the yield of product based on the amount of manganese carbonyl employed. Generally, from about eight to about 50 moles of acetylene are employed for each mole of the manganese carbonyl reactant. The quantities of reactants employed are not critical, however, and greater or lesser amounts of the acetylene may be used if desired.

In general, my process is carried out in the presence of a non-reactive solvent. The nature of the solvent is not critical, although it has been found that polar solvents such as acetone, tetrahydrofuran and the dimethyl ether of diethylene glycol are preferable since the manganese carbonyl reactant is quite soluble in such solvents.

Typical of reaction solvents which may be employed in my process are high boiling saturated hydrocarbons such as n-octane, n-decane, and other paraffinic hydrocarbons having up to about 20 carbon atoms such as eicosane, pentadecane, and the like. Typical aromatic solvents are mesitylene, benzene, toluene, xylenes, either pure or mixed, and the like. Typical ether solvents are ethyl octyl ether, ethyl hexyl ether, diethylene glycol methyl ether, diethylene glycol diethyl ether, diethylene glycol dibutyl ether, ethylene glycol dimethyl ether, ethylene glycol diethyl ether, trioxane, tetrahydrofuran, ethylene glycol dibutyl ether and the like. Ester solvents which may be employed include pentyl butanoate, ethyl deconate, ethyl hexanoate, and the like. Silicone oils such as the dimethyl polysiloxanes, bis(chlorophenyl) polysiloxanes, hexapropyl disilane, and diethyldipropyldiphenyldisilane may also be employed. Other ester solvents are those derived from succinic, maleic, glutaric, adipic, pimelic, suberic, azelaic, sebacic and pinic acids. Specific examples of such esters are di(2-ethylhexyl) adipate, di-(2-ethylhexyl) azelate, di-(2-ethylhexyl) sebacate, di-(methylcyclohexyl) adipate and the like.

The process is preferably conducted with agitation of the reaction mixture. Although agitation is not critical to the success or failure of the process, its use is preferred since it accomplishes a smooth and even reaction rate.

The time required for the process varies depending on the other reaction variables. In general, however, a time period from about 30 minutes to about 24 hours is sufficient.

In general, my process is carried out at temperatures between about 115 to about 180° C. Preferably, however, temperatures in the range from about 140 to about 160° C. are employed since, within this range, relatively higher yields are obtained with a minimum of undesirable side reactions. The pressure under which the process is carried out is not critical. Pressure is, however, critical in the sense that the acetylene pressure within the reaction system must be sufficiently high to put acetylene into solution so that it can react with the manganese carbonyl. In general, acetylene pressures ranging from about 100 to about 5,000 p.s.i.g. are employed. A preferable range of acetylene pressures is from about 200 to about 1,000 p.s.i.g.

The reaction may be carried out under a blanketing atmosphere of an inert gas such as nitrogen, helium, argon and the like. Normally, the acetylene reactant, which is present in the system as a gas, blankets the reaction mixture so as to prevent contacting of the reactants or products by an oxidizing gas such as oxygen. In some cases, it is desirable to use an inert gas in the system in conjunction with the acetylene reactant. In such cases, the function of the inert gas is primarily to control the pressure within the system without increasing the acetylene concentration.

The product, dihydropentalenyl manganese tricarbonyl, has very desirable physical properties for use as an antiknock. It is relatively stable, both thermally and oxidatively, and it is a liquid having a boiling point of 144° C. at 18 mm. Hg. It is, therefore, readily transportable in large quantities since it can be handled in pipe lines by means of conventional pumping equipment. Further, it is easily blended with hydrocarbon fuels due to the fact that it is a liquid.

The product, dihydropentalenyl manganese tricarbonyl, can be separated from the reaction mixture by conventional means such as distillation or chromatography. The preferable mode of separation is by distillation since the product is a liquid.

To further illustrate my novel process, there are presented the following examples in which all parts and percentages are by weight unless otherwise indicated.

EXAMPLE I

A solution comprising 20 parts of dimanganese decacarbonyl in 540 parts of tetrahydrofuran was charged to an autoclave. The autoclave was flushed with an additional 60 parts of tetrahydrofuran and 60 parts of acetylene were introduced into the autoclave. On introduction of the acetylene, an increase in the temperature from 10 to 25° C. was noted. The autoclave was then pressurized to 600 p.s.i.g. with nitrogen and heated to 150° C. over two hours. It was maintained at 150° C. for five hours and then cooled. A pressure increase of 250 p.s.i.g. over the initial reading was observed. The contents of the autoclave were then discharged and filtered to leave a red-brown residue. The solvent was removed from the filtrate by heating in vacuo, and the residual oil was distilled. There was obtained a yellow, somewhat viscous oil, having a phenol-like odor and a boiling point of 144° C. at 18 mm. Hg. Nine and nine tenths parts, or a 40 percent yield, of this product were obtained. The infrared spectrum of the product showed C–H absorption at 3.45 and 3.55 microns and strong metallo-carbonyl absorption at 5.05 and 5.25 microns. On analysis, there was found C, 55.4; H, 3.2; Mn, 22.2 percent. Calculated for $C_{11}H_7MnO_3$: C, 55.5 H, 2.88; Mn, 22.7 percent. The magnetic susceptibility of the compound was measured and it was found to be damagnetic. The molecular weight of the compound was determined by the Signer method to be 231; calculated for $C_{11}H_7MnO_3$ was 242. On the basis of the preceding analytical data and an independent synthesis which will be set forth later, the product was positively identified to be dihydropentalenyl manganese tricarbonyl.

EXAMPLE II

A solution comprising one mole of manganese carbonyl in benzene is charged to an autoclave along with 50 moles of acetylene. The reaction mixture is heated to 115° C. at an acetylene pressure of 4000 p.s.i.g. After being maintained at this temperature for 20 hours, the reaction mixture was cooled and discharged from the reaction vessel under nitrogen. The reaction mixture is filtered to remove solids; the filtrate is heated in vacuo to remove solvent, and the residue is fractionated. A good yield of dihydropentalenyl manganese tricarbonyl is thereby obtained.

EXAMPLE III

A solution comprising one mole of manganese carbonyl in isooctane is charged to a reaction vessel along with eight moles of acetylene. The reaction vessel is then heated to a temperature of 180° C. at a total pressure of 200 p.s.i.g. After heating for five hours, the reaction vessel is cooled, and the reaction product is discharged under nitrogen. The reaction product is filtered to remove solids, and the filtrate is reduced in volume by heating in vacuo. Fractionation of the residue gives a good yield of dihydropentalenyl manganese tricarbonyl.

EXAMPLE IV

A solution comprising one mole of manganese carbonyl in diethylene glycol dimethyl ether is charged to an autoclave along with 20 moles of acetylene. The reaction mixture is heated, with agitation, to a temperature of 140° C. at a total pressure of 400 p.s.i.g. After heating for 12 hours, the reaction vessel is cooled, and the contents are discharged under nitrogen. Filtration of the reaction product, removal of solvent, and fractionation of the residue gives a good yield of dihydropentalenyl manganese tricarbonyl.

EXAMPLE V

A solution comprising one mole of manganese carbonyl in toluene is charged to an evacuated autoclave along with 15 moles of acetylene. The reaction mixture is heated to 160° C. at a total pressure of 1000 p.s.i.g. After heating for eight hours, the reaction product is discharged, and a good yield of dihydropentalenyl manganese tricarbonyl is obtained, as in the previous examples, by means of distillation.

EXAMPLE VI

A solution comprising 25 parts of manganese carbonyl dissolved in 540 parts of pure acetone was charged to an autoclave along with 60 parts of acetylene. The autoclave was sealed and slowly heated for five hours and 40 minutes during which time the pressure rose to 425 p.s.i.g. and the temperature rose to 154° C. During the heating period, the reaction mixture was continuously stirred. The reaction mixture was then cooled slowly for 16 hours during which time the pressure in the autoclave dropped to 125 p.s.i.g., and the temperature dropped to 17° C. The autoclave was then slowly vented. Following this, it was twice pressurized to 200 p.s.i.g. with nitrogen and slowly flushed by venting. The autoclave was then discharged under nitrogen. The autoclave was rinsed several times with acetone to remove a fine solid material which remained in it. The reaction product together with the acetone rinses were combined, and the acetone solution was decanted from the solids. The acetone liquors were then stripped of acetone by passing through a fractionation column. The cut, distilling at 89–91° C. at a pressure of 1.0 mm. Hg, comprised 5.75 parts of an orange liquid. On analysis, the orange liquid was found to contain: C, 55.4; H, 3.18 and Mn, 22.2 percent. Calculated for $C_{11}H_7MnO_3$: C, 55.5; H, 2.88 and Mn, 22.7 percent. On the basis of the elemental analysis and the infrared spectrum of the product, it was clearly identified as dihydropentalenyl manganese tricarbonyl.

EXAMPLE VII

A 0.242 part sample of dihydropentalenyl manganese tricarbonyl, prepared as in Example I, was dissolved in 19.6 parts of ethanol and charged to a reaction vessel. A small quantity of Raney nickel was added, and hydrogen was introduced into the system at one atmosphere of pressure. Hydrogenation occurred as soon as the reaction mixture was stirred. The amount of hydrogen which was absorbed closely approximated the theoretical amount of hydrogen necessary to hydrogenate the double bond in dihydropentalenyl manganese tricarbonyl. The product was discharged; the solvent was removed in vacuo, and the residual oil was cooled. The residual oil solidified and was sublimed to give yellow crystals having a rhombic crystalline form and a melting point of 34.5–35.5° C. On analysis, there was found: C, 54.3; H, 3.9; Mn, 22.4 percent. Calculated for $C_{11}H_9MnO_3$: C, 54.2; H, 3.7; Mn, 22.5 percent. On the basis of the elemental analysis and the quantity of hydrogen absorbed in the reaction, the compound was identified as tetrahydropentalenyl manganese tricarbonyl.

In order to definitely prove the structure of the dihydropentalenyl manganese tricarbonyl compound, an independent synthesis was made of the tetrahydropentalenyl manganese tricarbonyl which was obtained on hydrogenation of the dihydropentalenyl manganese tricarbonyl. This independent synthesis is presented in the following example.

EXAMPLE VIII

A solution comprising 21.4 grams of lithium aluminum tri(tert-butoxy) hydride in 49 ml. of diethylene glycol dimethyl ether was added to a stirred solution comprising 16.5 grams of [(chloroformyl)cyclopentadienyl] manganese tricarbonyl in 215 ml. of diethylene glycol dimethyl ether. The addition took place over a one and one-half hour period during which the temperature of the [(chloroformyl)cyclopentadienyl] manganese tricarbonyl solution was maintained at −78° C. After addition was complete, the reaction mass was allowed to warm to room temperature. It was poured onto ice and acidified to Congo red with hydrochloric acid. The mixture was extracted with ether; the ether was dried, and the solvent was removed to yield an oil. The oil was distilled to give 11.6 grams (81 percent yield) of [(formyl)cyclopentadienyl] manganese tricarbonyl which was a low-melting solid.

A mixture comprising 11.6 grams of [(formyl)cyclopentadienyl] manganese tricarbonyl, 5.3 grams of malonic acid and 4.66 grams of α-picoline was heated on a steam bath for two hours. Evolution of 800 ml. of gas was observed. The theoretical evolution of gas was 1100 ml. The reaction mixture was poured into water, and this was extracted with ether. The ether extracts were further extracted with carbonate solution. Acidification of the carbonate extracts gave 8.3 grams (61 percent yield) of [(2-carboxyvinyl)cyclopentadienyl] manganese tricarbonyl which was a yellow solid. The melting point of the product, after recrystallization from chloroform-benzene solution, was 156–157° C.

A solution comprising 0.5 gram of [(2-carboxyvinyl)-cyclopentadienyl] manganese tricarbonyl in 20 ml. of ethanol was hydrogenated over Raney nickel at atmospheric pressure. After one hour, the hydrogen uptake had ceased, and the reaction mixture was then filtered and the solvent removed. Recrystallization of the remaining oil from chloroform-petroleum ether solution gave 0.3 gram (60 percent yield) of [(2-carboxyethyl)-cyclopentadienyl] manganese tricarbonyl which was a yellow solid having a melting point of 136–138° C.

To 40 grams of polyphosphoric acid was added 4.67 grams of [(2-carboxyethyl)cyclopentadienyl] manganese tricarbonyl. The mixture was stirred and heated at 70–90° C. for three hours. After pouring onto ice, the mixture was extracted with ether. The ether extracts were extracted with carbonate solution after which they were dried and the solvent was removed to yield 2.8 grams (65 percent yield) of tetrahydro-4-oxopentalenyl manganese tricarbonyl.

To a mixture comprising five grams of amalgamated zinc, 30 ml. of water, 30 ml. of hydrochloric acid, 10 ml. of toluene and three ml. of dioxane was added one gram of tetrahydro-4-oxopentalenyl manganese tricarbonyl. The mixture was stirred at reflux for 24 hours. At the three hour mark, 30 ml. of hydrochloric acid and five grams of amalgamated zinc were added, and at the 18 hour mark 10 ml. of hydrochloric acid were added. After the reaction mixture had cooled, the liquid was decanted and extracted with ether. The ether extracts were extracted several times with a 10 percent solution of hydrochloric acid after which they were dried, and the solvent was removed. The residual oil was chromatographed on alumina with benzene. The first fraction was taken and distilled, after the removal of the solvent, to yield 0.3 gram (32 percent yield) of a yellow solid having a melting point of 34.5–35.5° C. This was shown by means of infrared absorption, mixed melting point, vapor-phase chromatography and X-ray diffraction patterns to be tetrahydropentalenyl manganese tricarbonyl which was in all respects identical to the tetrahydropentalenyl manganese tricarbonyl produced by hydrogenation of pentalenyl manganese tricarbonyl in Example VII.

A further embodiment of my invention involves the use of dihydropentalenyl manganese tricarbonyl as an antiknock agent in a liquid hydrocarbon fuel used in spark-ignition internal combustion engines. For this use, I provide liquid hydrocarbon fuel of the gasoline boiling range containing from about 0.05 to about 10 grams per gallon of manganese as the compound dihydropentalenyl manganese tricarbonyl. It is found that these compositions, when employed as fuels for a spark-ignition internal combustion engine, greatly reduce the tendency of the engine to knock.

Preferred compositions of my invention comprise a hydrocarbon of the gasoline boiling range containing from about 1.0 to about 6.0 grams of manganese per gallon of fuel as the compound dihydropentalenyl manganese tricarbonyl. This range of metal concentration is preferred since it is found that superior fuels result from its employment.

The base fuels used to prepare the compositions of my invention have a wide variation of compositions. They generally are petroleum hydrocarbons and are usually blends of two or more components containing a mixture of many individual hydrocarbon compounds. These fuels can contain all types of hydrocarbons, including paraffins, both straight and branched chain; olefins; cycloaliphatics containing paraffin or olefin side chains; and aromatics containing aliphatic side chains. The fuel type depends on the base stock from which it is obtained and on the method of refining. For example, it can be straight run or processed hydrocarbon, including thermally cracked, catalytically cracked, reformed fractions, etc. When used for spark-fired engines, the boiling range of the components in gasoline can vary from zero to about 430° F., although the boiling range of the fuel blend is often found to be between an initial boiling point of from about 80° F. to 100° F. and a final boiling point of about 430° F. While the above is true for ordinary gasoline, the boiling range is somewhat more restricted in the case of aviation gasoline. Specifications for the latter often call for a boiling range of from about 82° F. to about 338° F., with certain fractions of the fuel boiling away at particular intermediate temperatures.

These fuels often contain minor quantities of various impurities. One such impurity is sulfur, which can be present either in a combined form as an organic or inorganic compound, or as elemental sulfur. The amounts of such sulfur can vary in various fuels about 0.003 percent to about 0.30 percent by weight. Fuels containing quantities of sulfur, both lesser and greater than the range of amounts referred to above, are also known. These fuels also often contain added chemicals in the nature of antioxidants, rust inhibitors, dyes, and the like.

The compound of my invention can be added directly to the hydrocarbon fuel, and the mixture then subjected to stirring, mixing or other means of agitation until a homogeneous fluid results. In addition to my compound, the fuel may have added thereto antioxidants, metal deactivators, halohydrocarbon scavengers, phosphorus compounds, anti-rust and anti-icing agents, and supplementary wear inhibitors. The following examples are illustrative of improved fuels of my invention containing a dihydropentalenyl manganese tricarbonyl and also a method for preparing said improved fuels.

EXAMPLE IX

To a synthetic fuel consisting of 20 volume percent toluene, 20 volume percent isobutylene, 20 volume percent isooctane and 40 volume percent n-heptane is added dihydropentalenyl manganese tricarbonyl in amount such that the managanese concentration is 0.05 gram per gallon. The mixture is agitated until a homogeneous blend of dihydropentalenyl manganese tricarbonyl in the fuel is achieved. This fuel has substantially increased octane value.

EXAMPLE X

To 1000 gallons of commercial gasoline having a gravity of 59.0° API, an initial boiling point of 98° F. and a final boiling point of 390° F. which contains 45.2 volume percent paraffins, 28.4 volume percent olefins and 25.4 volume percent aromatics is added 10.0 grams per gallon of manganese as dihydropentalenyl manganese tricarbonyl to give a fuel of enhanced octane quality.

EXAMPLE XI

Dihydropentalenyl manganese tricarbonyl is added in amount sufficient to give a manganese concentration of 6.0 gram per gallon to a gasoline having an initial boiling point of 93° F., a final boiling point of 378° F. and an API gravity of 56.2°.

EXAMPLE XII

To a liquid hydrocarbon fuel containing 49.9 volume percent paraffins, 15.9 volume percent olefins and 34.2 volume percent aromatics and which has an API gravity of 51.5°, an initial boiling point of 11° F. and a final boiling point of 394° F. is added dihydropentalenyl manganese tricarbonyl to give a manganese concentration of 1.0 gram per gallon.

EXAMPLE XIII

To the fuel of Example XII is added dihydropentalenyl manganese tricarbonyl in amount such that the manganese concentration is 3.0 gram per gallon.

A further embodiment of the present invention comprises a liquid hydrocarbon fuel of the gasoline boiling range containing an organolead antiknock agent and in addition dihydropentalenyl manganese tricarbonyl as defined previously. In this embodiment of the invention, it is often desirable that the fuel contain also conventional halohydrocarbon scavengers or corrective agents as conventionally used with organolead antiknock agents. When an organolead antiknock agent is employed, it may be present in the fuel in concentrations up to about eight grams of lead per gallon. In the case of aviation fuels, up to 6.34 grams of lead may be employed.

For each gram of lead, there may be present from about 0.008 to about 10 grams of manganese as dihydropentalenyl manganese tricarbonyl. A preferred range comprises those compositions containing from about 0.01 to about six grams of manganese as dihydropentalenyl manganese tricarbonyl for each gram of lead as an organolead compound.

A preferred embodiment of my invention comprises a liquid hydrocarbon fuel of the gasoline boiling range containing from about 0.5 to about 6.34 grams of lead per gallon as an organolead antiknock agent and from about 0.008 to about one gram of manganese per gallon as dihydropentalenyl manganese tricarbonyl. A further preferred aspect of my invention comprises compositions, as defined previously, in which the manganese concentration ranges from about 0.01 to about 0.5 and most preferably from about 0.01 to about 0.3 grams of manganese per gallon. These ranges of metal concentrations are preferred as it has been found that especially superior fuels—particularly from a cost-effectiveness standpoint—result from their use.

The organolead antiknock agents are ordinarily hydrocarbolead compounds including tetraphenyllead, dimethyldiphenyllead, tetrapropyllead, dimethyldiethyllead, tetramethyllead and the like. Tetraethyllead is preferred as it is most commonly available as a commercial antiknock agent. It is also convenient in the case where organolead antiknock agents are employed to premix into a fluid the dihydropentalenyl manganese tricarbonyl, the organolead antiknock agent and supplementary agents, such as scavengers, antioxidants, dyes and solvents, which fluids are later added to the liquid hydrocarbon fuel to be improved.

Where halohydrocarbon compounds are employed as scavenging agents, the amounts of halogen used are given in terms of theories of halogen. A theory of halogen is defined as the amount of halogen which is necessary to react completely with the metal present in the antiknock mixture to convert it to the metal dihalide, as for example, lead dihalide. In other words, a theory of halogen represents two atoms of halogen for every atom of lead present. In like manner, a theory of phosphorus is the amount of phosphorus required to convert the lead present to lead orthophosphate, $Pb_3(PO_4)_3$, that is, a theory of phosphorus represents two atoms of phosphorus for every three atoms of lead. One theory of arsenic, antimony and bismuth is defined in the same general way. That is, one theory thereof is two atoms of the element per each three atoms of lead.

The halohydrocarbon scavengers which can be employed in the compositions of this invention can be either aliphatic or aromatic halohydrocarbons or a combination of the two having halogen attached to carbon in either the aliphatic or aromatic portion of the molecule. The scavengers may also be carbon, hydrogen and oxygen containing compounds, such as haloalkyl ethers, halohydrins, halo ethers, halonitro compounds, and the like. Still other examples of scavengers that may be used in the fuels of this invention are illustrated in U.S. Patents 1,592,954; 1,668,022; 2,398,281; 2,479,900; 2,479,901; 2,479,902; 2,479,903; 2,496,983; 2,661,379; 2,822,252; 2,849,302; 2,849,303; and 2,849,304. Mixtures of different scavengers may also be used and other scavengers and modifying agents, such as phosphorus compounds, may also be included. Concentrations of organic halide scavengers ranging from about 0.5 to about 2.5 theories based on the lead are usually sufficient, although greater or lesser amounts may be used. See, for example, the description of scavenger concentrations and proportions given in U.S. Patent 2,398,381. Such concentrations and proportions can be successfully used in the practice of this invention.

When used in the compositions of this invention, phosphorus, arsenic, antimony and bismuth compounds have the property of altering engine deposit characteristics in several helpful ways. Thus, benefits are achieved by including in the compositions of this invention one or more gasoline-soluble organic compounds of the elements of group VA of the periodic table, which elements have atomic numbers 15 through 83. The periodic table to which reference is made is found in Lange's Handbook of Chemistry, 7th edition, pages 58–59. One effect of these group VA compounds is to alter the deposits so that in the case of spark plugs the resulting deposits are less conductive. Thus, imparted to the spark plug is greater resistance to fouling. In the case of combustion chamber surface deposits, the group VA element renders these deposits less catalytic with respect to hydrocarbon oxidation and thus reduces surface ignition. In addition, these group VA elements in some way inhibit deposit build up on combustion chamber surfaces, notably exhaust valves. This beneficial effect insures excellent engine durability. In particular, excellent exhaust valve life is assured. Of these group VA elements the use of gasoline-soluble phosphorus compounds is preferred from the cost-effectiveness standpoint. Applicable phosphorus additives include the general organic phophorus compounds, such as derivatives of phosphoric and phosphorous acids. Representative examples of these compounds include trimethylphosphate, trimethyl phosphite, phenyldimethylphosphate, triphenylphosphate, tricresylphosphate, tri-β-chloropropyl thionophosphate, tributoxyethylphosphate, xylyl dimethylphosphate, and other alkyl, aryl, aralkyl, alkaryl and cycloalkyl analogues and homologues of these compounds. Phenyldimethylphosphates in which the phenyl group is substituted with up to three methyl radicals are particularly preferred because they exhibit essentially no antagonistic effects upon octane quality during engine combustion. Other suitable phosphorus compounds are exemplified by dixylyl phosphoramidate, tributylphosphine, triphenylphosphine oxide, tricresyl thiophosphate, cresyldiphenyl phosphate, and the like. Gasoline-soluble compounds of arsenic, antimony and bismuth corresponding to the above phosphorus compounds are likewise useful in this respect. Thus, use can be made of various alkyl, cycloalkyl, aralkyl, aryl and/or alkaryl, arsenates, arsenites, antimonates, antimonites, bismuthates, bismuthites, etc. Tricresyl arsenite, tricumenyl arsenate, trioctyl antimonate, triethyl antimonite, diethylphenyl bismuthate and the like serve as examples. Other very useful arsenic, antimony and bismuth compounds include methyl arsine, trimethyl arsine, triethyl arsine, triphenyl arsine, arseno benzene, triisopropyl bismuthine, tripentyl stibine, tricresyl stibine, trixylyl bismuthine, tricyclohexyl bismuthine and phenyl dicresyl bismuthine. From the gasoline solubility and engine inductibility standpoints, organic compounds of these group VA elements having up to about 30 carbon atoms in the molecule are preferable. Concentrations of these group VA compounds ranging from about 0.05 to about one theory based on the lead normally suffice. In other words, the foregoing technical benefits are achieved when the atom ratio of group VA element-to-lead ranges from about 0.1:3 to about 2:3.

A further embodiment of my invention comprises antiknock fluids containing an organolead antiknock agent, dihydropentalenyl manganese tricarbonyl, and, optionally, a scavenger for the organolead compound. The quantities of manganese and scavenger present with respect to the quantity of lead present are the same as set forth in the preceding paragraphs in describing a hydrocarbon fuel containing these various components. Thus, the fluid can be blended with a hydrocarbon base fuel to give the fuel compositions described above.

The following examples are illustrative of fuels and fluids containing organolead compounds in combination with dihydropentalenyl manganese tricarbonyl.

EXAMPLE XIV

To 1000 gallons of a gasoline containing 46.2 percent paraffins, 28.4 percent olefins, and 25.4 percent aromatics which has a final boiling point of 390° F. and an API gravity of 59.0° and which contains three milliliters of tetraethyllead as 62-Mix (1 theory of ethylene dichloride and 0.5 theory of ethylene dibromide) is added sufficient dihydropentalenyl manganese tricarbonyl to give a manganese concentration of six grams per gallon.

EXAMPLE XV

A fluid for addition to gasoline is prepared by admixing tetraethyllead, dihydropentalenyl manganese tricarbonyl and trimethylphosphate in amount such that for each gram of lead there is 0.01 gram of manganese and 0.1 theory of trimethylphosphate.

To demonstrate the effectiveness of hydrocarbon fuels blended with dihydropentalenyl manganese tricarbonyl according to the invention, tests were made on fuels to which no antiknock agent was added and fuels which were blended in accordance with this invention. These tests were conducted according to the research method. The research method of determining octane number of a fuel is generally accepted as a method of test which gives a good indication of fuel behavior in full scale automotive engines under normal driving conditions and is the method most used by commercial installations in determining the value of a gasoline additive. The research method of testing antiknocks is conducted in a single cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D-908-55 contained in the 1956 edition of "ASTM Manual of Engine Test Methods for Rating Fuels." When tested in this manner, it is found that the addition of one gram of manganese per gallon as dihydropentalenyl manganese tricarbonyl, causes a substantial increase in the octane number of a non-additive containing gasoline.

Further tests which were performed using the research method involved the base reference fuels which contained both a lead antiknock and halohydrocarbon scavengers. To the reference fuel was added dihydropentalenyl manganese tricarbonyl. In each case, a substantial gain in the octane number of the base fuel was noted.

These results are set forth in the following table. The reference fuel to which dihydropentalenyl manganese tricarbonyl was added comprised 40 percent by volume of toluene, 30 percent by volume of n-heptane, 20 percent by volume of diisobutylene, and 10 percent by volume of isooctane and contained three ml. of tetraethyllead per gallon as 62-Mix. 62-Mix is a commercial antiknock fluid comprising tetraethyllead, 1.0 theory of ethylene dichloride and 0.5 theory of ethylene dibromide.

*Table I.—Research Octane Number*

CONCENTRATION OF DIHYDROPENTALENYL MANGANESE TRICARBONYL EXPRESSED AS GRAMS OF MANGANESE PER GALLON

| 0 | 0.05 | 0.1 | 0.2 | 0.5 | 1.0 |
|---|---|---|---|---|---|
| 97.9 | 99.5 | 99.9 | 100.2 | 100.4 | 100.7 |
| 98.3 | 99.5 | 99.9 | 100.3 | 100.5 | 100.9 |

Similar results are obtained using concentrations of the dihydropentalenyl manganese tricarbonyl up to 10 grams of manganese for each gram of lead in the fuel.

As shown by the above data, dihydropentalenyl manganese tricarbonyl is extremely effective as a supplemental antiknock. As is the case with most supplemental antiknocks, it is generally more effective as a supplement at low concentrations, and its effectiveness is diminished as its concentration is increased.

A further use for my compound is in gas phase metal plating. In this application, the compound is thermally decomposed in an atmosphere of a reducing gas such as hydrogen or a neutral atmosphere such as nitrogen to form metallic films on a sub-strate material. These films have a wide variety of applications. They may be used in forming conductive surfaces such as employed in a printed circuit, in producing a decorative effect on a sub-strate material or in applying a corrosion-resistant coating to a sub-strate material.

My compound also finds application as an additive to lubricating oils and greases to impart improved lubricity characteristics thereto. Further, my compound may be incorporated in paints, varnish, printing inks, synthetic resins of the drying oil type, oil enamels and the like to impart improved drying characteristics to such compositions. Another important utility of my compound is its use as a chemical intermediate in the preparation of metal-containing polymeric materials.

My compound, dihydropentalenyl manganese tricarbonyl, may also be used as an additive to distillate fuels generally such as those used in home heating, jet fuels, and diesel fuels. In this application, my compound serves to reduce smoke and/or soot formation on combustion of the fuel.

Having fully defined the novel compounds of my invention, their novel mode of preparation and their manifold utilities, I desire to be limited only within the lawful scope of the appended claims.

I claim:

1. Process for the preparation of dihydropentalenyl manganese tricarbonyl, said process comprising contacting acetylene with dimanganese decacarbonyl in the proportion of from about 8 to about 50 moles of acetylene per mole of dimanganese decacarbonyl, at a temperature within the range of from about 140–160° C. and at an acetylene pressure of from about 200 to about 1,000 p.s.i.g., said process being carried out in the presence of a non-reactive polar organic solvent.

2. The process of claim 1 wherein said solvent is selected from the class consisting of tetrahydrofuran, diethyleneglycol dimethylether, and acetone.

3. Process for the preparation of dihydropentalenyl manganese tricarbonyl, said process comprising contacting acetylene with dimanganese decacarbonyl in the proportion of from about 8 to about 50 moles of acetylene per mole of dimanganese decacarbonyl, said process being carried out at a temperature from about 140–160° C. and at an acetylene pressure from about 200 to about 1,000 p.s.i.g., said process being carried out in the presence of tetrahydrofuran.

4. Process for the preparation of dihydropentalenyl manganese tricarbonyl, said process comprising contacting acetylene with dimanganese decacarbonyl in the proportion of from about 8 to about 50 moles of acetylene per mole of dimanganese decacarbonyl, said process being carried out at a temperature from about 140–160° C. and at an acetylene pressure from about 200 to about 1,000 p.s.i.g., said process being carried out in the presence of acetone.

5. A process for the preparation of dihydropentalenyl manganese tricarbonyl, said process comprising contacting acetylene with dimanganese decacarbonyl in the proportion of from about 8 to about 50 moles of acetylene per mole of manganese decacarbonyl, and conducting the contacting in a non-reactive polar organic solvent at a temperature of from about 115° to about 180° C. and an acetylene pressure sufficient to dissolve the acetylene in the system, and cause it to react with the dimanganese decacarbonyl.

References Cited in the file of this patent

FOREIGN PATENTS

| | | |
|---|---|---|
| 229,362 | Australia | July 17, 1958 |
| 567,743 | Belgium | Sept 15, 1958 |

OTHER REFERENCES

Hubel et al.; "J. Inorg. Nucl. Chem.," pages 204–210, vol. 9, March 1959.

"Chemical and Engineering News," May 5, 1958, pages 43–44.

Schrauzer: "Chemistry and Industry," page 1404, October 25, 1958.